United States Patent
Goupil et al.

(10) Patent No.: US 12,168,942 B2
(45) Date of Patent: Dec. 17, 2024

(54) INTERMEDIATE FLOW-STRAIGHTENING CASING WITH MONOBLOC STRUCTURAL ARM

(71) Applicant: SAFRAN AIRCRAFT ENGINES, Paris (FR)

(72) Inventors: Frederic Jacques Eugene Goupil, Moissy-Cramayel (FR); Francois Marie Paul Marlin, Moissy-Cramayel (FR); Kaelig Merwen Orieux, Moissy-Cramayel (FR); Philippe Verseux, Moissy-Cramayel (FR); Yacine Cheraga, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/996,730

(22) PCT Filed: Apr. 22, 2021

(86) PCT No.: PCT/FR2021/050695
§ 371 (c)(1),
(2) Date: Oct. 20, 2022

(87) PCT Pub. No.: WO2021/219949
PCT Pub. Date: Nov. 4, 2021

(65) Prior Publication Data
US 2023/0228201 A1   Jul. 20, 2023

(30) Foreign Application Priority Data
Apr. 29, 2020 (FR) ...................................... 2004258

(51) Int. Cl.
*F01D 9/04* (2006.01)
*F01D 25/28* (2006.01)

(52) U.S. Cl.
CPC ............. *F01D 9/042* (2013.01); *F01D 9/041* (2013.01); *F01D 25/28* (2013.01)

(58) Field of Classification Search
CPC .. F01D 9/04–044; F01D 25/28; F01D 25/246; F01D 25/162
See application file for complete search history.

(56) References Cited

U.S. PATENT DOCUMENTS 8,133,011 B2 * 3/2012 Cortequisse .......... F01D 21/045
415/142
8,708,649 B2 * 4/2014 Wery ...................... F01D 5/282
415/209.3

(Continued)

FOREIGN PATENT DOCUMENTS

| EP | 3450685 A1 | 3/2019 |
| JP | 4918034 B2 | 4/2012 |
| SE | 528183 C2 | 9/2006 |

OTHER PUBLICATIONS

International Search Report and Written Opinion received for PCT Patent Application No. PCT/FR2021/050695, mailed on Aug. 17, 2021, 20 pages (10 pages of English Translation and 10 pages of Original Document).

*Primary Examiner* — Brian P Wolcott
(74) *Attorney, Agent, or Firm* — WOMBLE BOND DICKINSON (US) LLP

(57) ABSTRACT

An annular intermediate casing for a turbomachine through which an aerodynamic airstream circulates, including a radially internal shroud, a radially external shroud, at least one stator blade including a vane with a leading edge, and at least one aero-dynamic member which is formed of a structural arm extending radially at least in part between the radially internal shroud and the radially external shroud. The aerodynamic member includes a leading edge which is aligned with the leading edge of the stator blade in one plane (Continued)

and which is borne by a profiled portion positioned upstream of the structural arm in the direction of circulation of the aerodynamic airstream, the profiled portion, the structural arm, the radially internal shroud and the radially external shroud being monobloc.

16 Claims, 6 Drawing Sheets

(56) References Cited

U.S. PATENT DOCUMENTS

| | | | |
|---|---|---|---|
| 9,556,746 B2* | 1/2017 | Paradis | F01D 5/142 |
| 10,267,170 B2* | 4/2019 | Clark | F01D 9/041 |
| 10,337,340 B2* | 7/2019 | Cortequisse | F01D 25/246 |
| 10,385,708 B2* | 8/2019 | Damevin | F01D 9/041 |
| 10,458,247 B2* | 10/2019 | Charbonnier | F02C 9/18 |
| 11,236,627 B2* | 2/2022 | Germain | F01D 5/14 |
| 2006/0275110 A1* | 12/2006 | Baralon | F01D 9/041 |
| | | | 415/191 |
| 2013/0259672 A1* | 10/2013 | Suciu | F01D 1/04 |
| | | | 415/208.1 |
| 2016/0130960 A1* | 5/2016 | Cortequisse | F01D 5/02 |
| | | | 415/173.4 |
| 2018/0252231 A1* | 9/2018 | Northall | F02C 3/06 |
| 2019/0040753 A1 | 2/2019 | Spangler et al. | |

* cited by examiner

INTERMEDIATE FLOW-STRAIGHTENING CASING WITH MONOBLOC STRUCTURAL ARM

FIELD OF THE INVENTION

The invention relates to the general field of dual flow turbomachines for aircraft. In particular, it concerns a fixed turbomachine casing comprising an annular row of fixed vanes and an annular row of structural arms.

TECHNICAL BACKGROUND

The prior art includes the documents SE-C2-528183C2, US-B2-10458247 and EP-A1-3450685.

A dual flow turbomachine, in particular an aircraft, which extends along a longitudinal axis, comprises a movable fan arranged upstream of at least one compressor, along the direction of gas flow in the turbomachine. The air flow passing through the ducted fan is divided into a primary flow which circulates in a primary vein where the compressor is at least in part housed and a secondary flow which circulates in a secondary vein around the compressor. These primary and secondary veins are separated by an annular inter-vein casing which bears an annular splitter nose separating the veins.

The primary vein is formed, at least in part, of an inlet casing, which is located upstream of the compressor and bears the splitter nose, a low-pressure compressor casing, a high-pressure compressor casing and an intermediate casing, which is located downstream of the low-pressure compressor casing and upstream of the high-pressure compressor casing. The inlet casing and the intermediate casing are structural casings that allow the transmission of forces. The intermediate casing includes structural arms that extend radially across the primary flow and are configured to allow the passage of auxiliaries. The inlet casing further comprises an annular row of fixed vanes known as Inlet Guide Vane (IGVs).

The compressor typically comprises one or more stages each comprising an annular row of guide vanes mounted upstream of a respective annular row of movable vanes. Typically, there may be up to five annular rows of guide vanes. Each annular row of guide (or stator) vanes is supported by the compressor casing and each annular row of movable vanes is mounted on a disc or drum centred on the longitudinal axis of the turbomachine. The fifth stage is generally located upstream of a portion of the turbomachine hub that has a "gooseneck" shape.

The structural casings carrying structural arms and the low-pressure compressor with its many stages elongate the turbomachine along the longitudinal axis and therefore negatively impact the mass of the turbomachine.

SUMMARY OF THE INVENTION

The objective of the present invention is to provide a solution to reduce the size of the turbomachine while maintaining the performance of the turbomachine.

This objective is achieved in accordance with the invention by means of an annular intermediate casing for a turbomachine of longitudinal axis X, in particular, for an aircraft, through which an aerodynamic air flow is intended to circulate at least in part, the intermediate casing comprising:
  an annular radially inner shroud,
  an annular radially outer shroud,
  at least one stator vane extending substantially along a radial axis Z between a first platform and a second platform, the stator vane comprising a blade with a leading edge and a trailing edge, and
  at least one aerodynamic member which is formed of a structural arm extending radially at least in part between the radially inner shroud and the radially outer shroud,
  the aerodynamic member comprising a leading edge which is aligned with the leading edge of the stator vane in a plane perpendicular to the longitudinal axis X, the leading edge of the aerodynamic member being borne by a profiled portion positioned upstream of the structural arm in the direction of circulation of the aerodynamic air flow, the profiled portion and the structural arm being monobloc, and
  the aerodynamic member being monobloc with the radially inner shroud and the radially outer shroud.

Thus, this solution achieves the above-mentioned objective. In particular, this solution allows to reduce the size of the turbomachine, especially in terms of its length along the longitudinal axis. This axial gain can reach at least 30 mm, which is not negligible in a turbomachine and with respect to the mass of the turbomachine. In addition, the construction of the aerodynamic member in one piece, on the one hand, and with the shrouds of the intermediate casing on the other, favours the gain in mass of the turbomachine and the time of mounting and dismounting of the assembly. The fan also shifts by at least 30 mm in the case of a dual flow turbomachine. In addition, the mounting and dismounting of such an intermediate casing is made easier.

The casing also comprises one or more of the following features, taken alone or in combination:
  the profiled portion extends radially between a radially inner platform and a radially outer platform, the radially inner and radially outer platforms being respectively monobloc with the radially inner shroud and radially outer shroud, and in that the radially inner platform has a radially inner surface bearing a first layer of abradable material.
  the first platform and the second platform are added on and fixed to the radially inner shroud and the radially outer shroud respectively, the first platform having a radially inner surface bearing a second layer of abradable material, the second layer of abradable material being aligned along the circumferential direction with the first layer of abradable material.
  the intermediate casing comprises at least two aerodynamic members spaced along a circumferential direction about the longitudinal axis X and a straightening assembly which is added on between the two aerodynamic members, the straightening assembly comprising the first platform, the second platform and a plurality of stator vanes extending radially between the first and second platforms and being distributed regularly in the circumferential direction, each leading edge of the plurality of stator vanes is aligned with the leading edge of the aerodynamic member in the plane perpendicular to the longitudinal axis X.
  the first platform comprises a base which is fixed to an annular range of the radially inner shroud with at least one fixing member providing an axial fixation.
  the second platform is fixed to a radial wall of the radially outer shroud which extends radially towards the outside from a radially outer surface and via at least one fixing member.

the second platform has tabs each extending from its radially outer surface, each tab being fixed to an axial leg of the radial wall with the fixing members providing a radial fixation.

the second platform comprises a radial attachment flange extending radially towards the outside from its radially outer surface and along the circumferential direction on its entire periphery, the radial attachment flange being fixed to a lower branch of the radial wall that extends along the radial axis and with the fixing members providing an axial fixation.

the first platform is monobloc with the radially inner shroud and the second platform is monobloc with the radially outer shroud, the first and second platforms each comprising respectively a plurality of slots of complementary shape with the blades of the stator vanes which are distributed regularly about the longitudinal axis X, each stator vane comprising a radially inner end which is received in a corresponding first slot of the first platform and a radially outer end which is received in a corresponding second slot of the second platform.

each of the radially outer or inner ends is secured to an abutment platform lying radially towards the outside of a first or second platform and the other of each of the radially inner or outer ends radially opposite is locked or fixed to the first or second platform.

the locking or fixing is achieved by a locking device or a weld.

the straightening assembly is monobloc.

the leading edge of the aerodynamic member is located at an axial distance from a zone of intersection between the profiled portion and the structural arm, and in that the zone of intersection has a thickness along the circumferential direction substantially equal to three times the master torque of the profiled portion.

the stator vane has an axial chord measured between the leading edge and the trailing edge and in that the profiled portion has an axial length measured between the leading edge of the aerodynamic member and the zone of intersection substantially equal to the axial chord.

the radial axis is perpendicular to the longitudinal axis.

the intermediate casing is made by casting or additive manufacturing.

the radial wall of the intermediate casing is T-shaped with a lower branch, an upper branch and an axial leg.

the radially inner and radially outer shrouds are concentric.

the intermediate casing comprises six aerodynamic members.

the intermediate casing is arranged axially downstream of a compressor casing of the turbomachine, in particular a low-pressure compressor casing.

the compressor comprises a compressor casing and compressor blades which extend substantially radially into the compressor casing, through a primary flow, and from a drum centred on the longitudinal axis, the casing of the compressor being made of a composite material, the compressor blades and the drum being made of a metallic material.

the movable vanes of the compressor are welded to the drum centred on the longitudinal axis.

the intermediate casing is an inter-compressor casing.

The invention also relates to an annular intermediate casing for a turbomachine of longitudinal axis X, in particular for an aircraft, through which an aerodynamic air flow is intended to flow at least in part, the intermediate casing comprising:

an annular radially inner shroud, an annular radially outer shroud, at least one stator vane extending substantially along a radial axis Z between a first platform and a second platform, the stator vane comprising a blade with a leading edge and a trailing edge, and at least one aerodynamic member which is formed of a structural arm extending radially at least in part between the radially inner shroud and the radially outer shroud, the aerodynamic member comprising a leading edge which is aligned with the leading edge of the stator vane in a plane perpendicular to the longitudinal axis X, the leading edge of the aerodynamic member being borne by a profiled portion arranged upstream of the structural arm in the direction of circulation of the aerodynamic air flow, the profiled portion and the structural arm being monobloc, and the aerodynamic member being monobloc with the radially inner shroud and the radially outer shroud, and in that the casing comprises at least two aerodynamic members spaced along a circumferential direction about the longitudinal axis X and a straightening assembly which is added on between the two aerodynamic members, the straightening assembly comprising the first platform, the second platform and a plurality of stator vanes extending radially between the first and second platforms and being distributed regularly in the circumferential direction, each leading edge of the plurality of stator vanes is aligned with the leading edge of the aerodynamic member in the plane perpendicular to the longitudinal axis X.

Such a solution enables to reduce the size of the turbomachine, particularly in terms of its length along the longitudinal axis, with an axial gain of up to at least 30 mm, which is not negligible in a turbomachine and in relation to the mass of the turbomachine. The construction of the aerodynamic member in one piece, on the one hand, and with the shrouds of the intermediate casing on the other hand, favours the gain in mass of the turbomachine and the mounting and dismounting time of the assembly. The fan also shifts by at least 30 mm in the case of a dual flow turbomachine. In addition, the mounting and dismounting of such an intermediate casing is made easier. Finally, the fact that the assembly comprising the stator vanes is attached between the aerodynamic members facilitates maintenance of the intermediate casing and reduces costs by only mounting and dismounting the straightening assembly and not the intermediate casing in its entirety.

The invention also relates to an annular intermediate casing for a turbomachine of longitudinal axis X, in particular for an aircraft, through which an aerodynamic air flow is intended to circulate at least in part, the intermediate casing comprising:

an annular radially inner shroud, an annular radially outer shroud, at least one stator vane extending substantially along a radial axis Z between a first platform and a second platform, the stator vane comprising a blade with a leading edge and a trailing edge, and at least one aerodynamic member which is formed of a structural arm extending radially at least in part between the radially inner shroud and the radially outer shroud, the aerodynamic member comprising a leading edge which is aligned with the leading edge of the stator vane in a plane perpendicular to the longitudinal axis X, the leading edge of the aerodynamic member being carried by a profiled portion arranged upstream of the structural arm in the direction of circulation of the aerodynamic air flow, the profiled portion and the structural arm being monobloc, and the aerodynamic member being monobloc with the radially inner shroud and the radially outer shroud, and in that the first platform is monobloc with the radially inner shroud and the second platform is monobloc with the radially outer shroud, the first and second platforms each comprising a plurality of slots complementary in shape to the blades of the stator vanes which are distributed regularly about the longitudinal axis X, each stator vane comprising a radially inner end which is received in a corresponding first slot of the first platform and a radially outer end which is received in a corresponding second slot of the second platform.

Such a solution allows to reduce the size of the turbomachine, in particular in terms of its length along the longitudinal axis, with an axial gain of up to at least 30 mm, which is not negligible in a turbomachine and in relation to the mass of the turbomachine. The construction of the aerodynamic member in one piece, on the one hand, and with the shrouds of the intermediate casing on the other hand, favours the gain in mass of the turbomachine and the time of mounting and dismounting of the whole. The fan also shifts by at least 30 mm in the case of a dual flow turbomachine. In addition, the mounting and dismounting of such an intermediate casing is made easier. Finally, the fact that the stator vanes are attached to the first and second platforms, which are integral with the shrouds of the casing, makes it easier to maintain the intermediate casing by intervening and/or replacing only one or several stator vanes at a time, since they are all added on.

The invention also relates to a turbomachine module of longitudinal axis X through which an aerodynamic airstream circulates, the module comprising at least one compressor surrounded by a compressor casing which is mounted on the turbomachine intermediate casing as mentioned above, the compressor casing comprising a bottom wall fixed to the radial wall of the intermediate casing.

The invention further relates to a dual flow turbomachine of longitudinal axis X, in particular for aircraft, comprising:
at least one fan generating an air flow and comprising at least one annular row of fan blades carried by a hub of longitudinal axis X,
a splitter nose, downstream of the row of fan blades separating the air flow into a primary flow circulating in an annular primary vein and a secondary flow circulating in a annular secondary vein,
at least one compressor arranged downstream of an inlet to the primary vein formed of an annular edge of the splitter nose and comprising annular rows of movable vanes and guide vanes, and
at least one turbomachine intermediate casing having any one of the preceding characteristics, the intermediate casing comprising a plurality of stator vanes distributed around the longitudinal axis X so as to straighten the air flow at the outlet of the last row of movable vanes of the compressor.

BRIEF DESCRIPTION OF THE FIGURES

The invention will be better understood, and other purposes, details, characteristics and advantages thereof will become clearer on reading the following detailed explanatory description of embodiments of the invention given by way of purely illustrative and non-limiting examples, with reference to the attached schematic drawings in which.

DETAILED DESCRIPTION OF THE INVENTION

Figure 1:
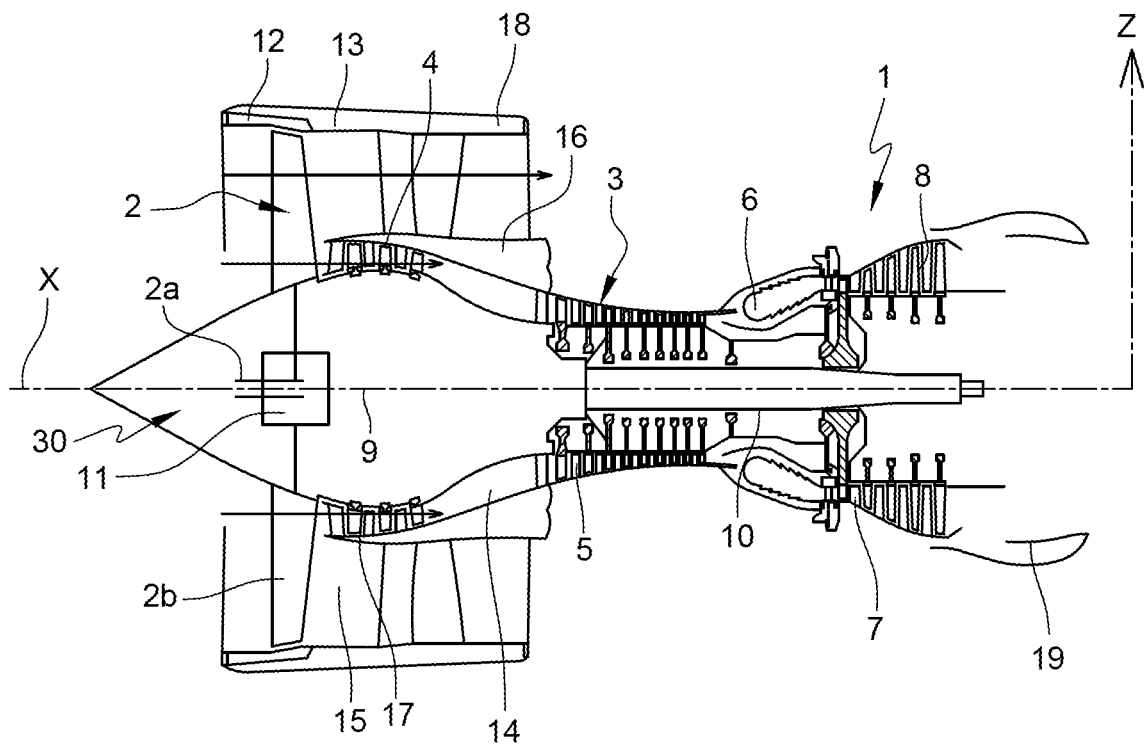
FIG. 1 is an axial cross-sectional view of an example of a turbomachine to which the invention applies.

FIG. 1 shows an axial cross-sectional view of a turbomachine of longitudinal axis X to which the invention applies. The turbomachine shown is a dual flow, dual body turbomachine 1 intended to be mounted on an aircraft, such as an aeroplane. Of course, the invention is not limited to this type of turbomachine.

In the present invention, and in general, the terms "upstream" and "downstream" are defined in relation to the circulation of gases or air flow in the turbomachine and here along the longitudinal axis X (and even from left to right in FIG. 1). The terms "axial" and "axially" are defined with respect to the longitudinal axis X. The terms "outer", "outside", "inside", "inner" and "radial" are defined with respect to a radial axis Z which extends from the longitudinal axis X and with respect to the distance from the longitudinal axis X. The radial axis is perpendicular to the longitudinal axis.

This dual flow turbomachine 1 generally comprises a fan 2 mounted upstream of a gas generator 3 or (gas turbine) engine.

The gas generator 3 comprises, from upstream to downstream, a low-pressure compressor 4, a high-pressure compressor 5, a combustion chamber 6, a high-pressure turbine 7 and a low-pressure turbine 8. Typically, the turbomachine comprises a low-pressure shaft 9 which connects the low-pressure compressor 4 and the low pressure turbine 8 to form a low pressure body and a high pressure shaft 10 which connects the high pressure compressor 5 and the high pressure turbine 7 to form a high pressure body. The low-pressure shaft 9, centred on the longitudinal axis X, is intended to drive a fan shaft 2a. A power transmission mechanism 11 such as a speed reduction gear may be interposed between the pressure shaft and the fan shaft 2a. The fan comprises fan blades 2b carried by a hub of longitudinal axis X.

The fan 2 is surrounded by a fan casing 12 carried by a nacelle 13 and compresses the air flow entering the turbomachine 1, which is divided into a primary air flow passing through the gas generator and in particular in a primary vein 14, and a secondary air flow circulating around the gas generator 3 in a secondary vein 15.

The primary flow and secondary flow are separated by an annular inter-vein casing 16 which carries a splitter nose 17. The secondary vein 15 extends radially outside the primary vein 14 and is coaxial with the latter. The secondary air flow is ejected through a secondary nozzle 18 terminating the nacelle 13 while the primary air flow is ejected outside the turbomachine via an ejection nozzle 19 located downstream of the gas generator 3.

Figure 2:
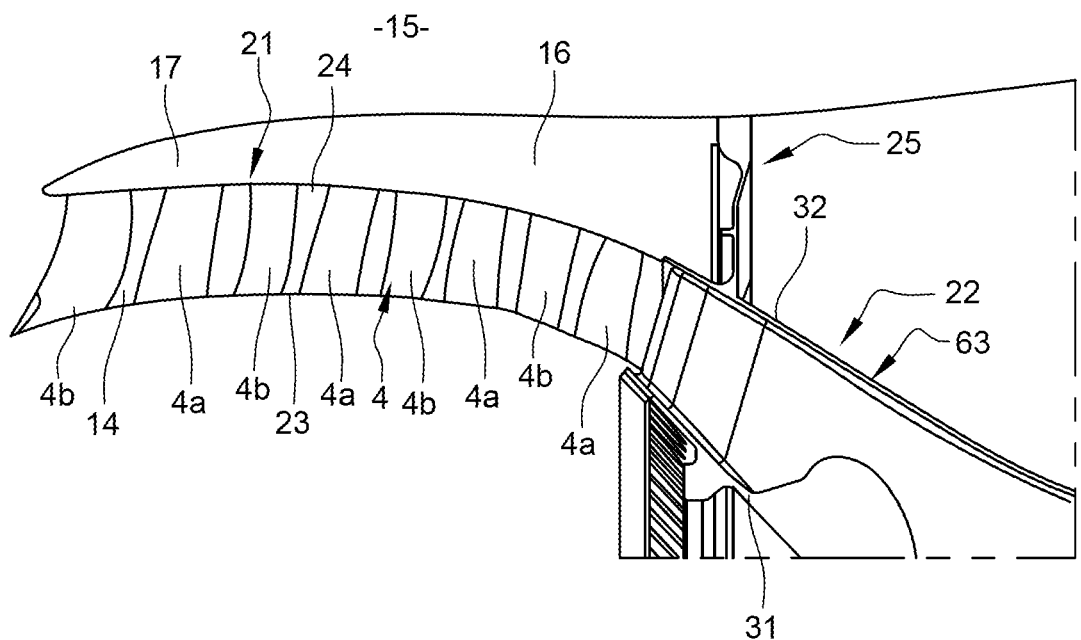
FIG. 2 is a partial axial cross-sectional view of the front of a turbomachine with a splitter nose partly delimiting a primary vein and a secondary vein according to the invention.

In FIG. 2, the secondary vein 15 is delimited at least in part along the longitudinal axis by a compressor casing 21 and a straightening intermediate casing 22. As already mentioned, these casings 21, 22 have a structural function as they allow the transmission of forces. In the present example, the intermediate casing 22 is arranged between the low-pressure compressor 4 and the high-pressure compressor 5. The intermediate casing 22 is referred to as the inter-compressor casing. The compressor casing 21 partly carries the splitter nose 17.

The compressor casing 21 surrounds the low-pressure compressor 4 and comprises an inner shroud 23 and an outer shroud 24, which are concentric along the longitudinal axis. The low-pressure compressor 4, like the high-pressure compressor 5 (and the turbines), comprises several stages of vane rings, each with an annular row of guide vanes (stators) respectively mounted upstream of an annular row of movable vanes (rotors). FIG. 2 shows four annular rows of guide vanes 4b alternating with four annular rows of movable vanes 4a. Each row of guide vanes comprises a plurality of guide or fixed vanes which are distributed circumferentially around the longitudinal axis X. The guide vanes each comprise a blade which extends substantially radially between an inner annular wall and an outer annular wall (not shown). The outer annular wall is advantageously carried by two angled half-shells centred on the longitudinal axis.

In this example, each row of movable vanes 4a of the compressor comprises a plurality of movable vanes which are equally distributed circumferentially around a drum (not shown) centred on the longitudinal axis X and radially from this drum. The drum is arranged in a hub 30 through which the low-pressure shaft 9 passes. The movable vanes are welded to the drum. The guide vanes deflect and straighten the aerodynamic flow at the outlet of each movable vane located upstream of them.

The half shells of the compressor casing are made of a composite material. The movable vanes and the guide vanes are made of a metallic material.

Figure 3:
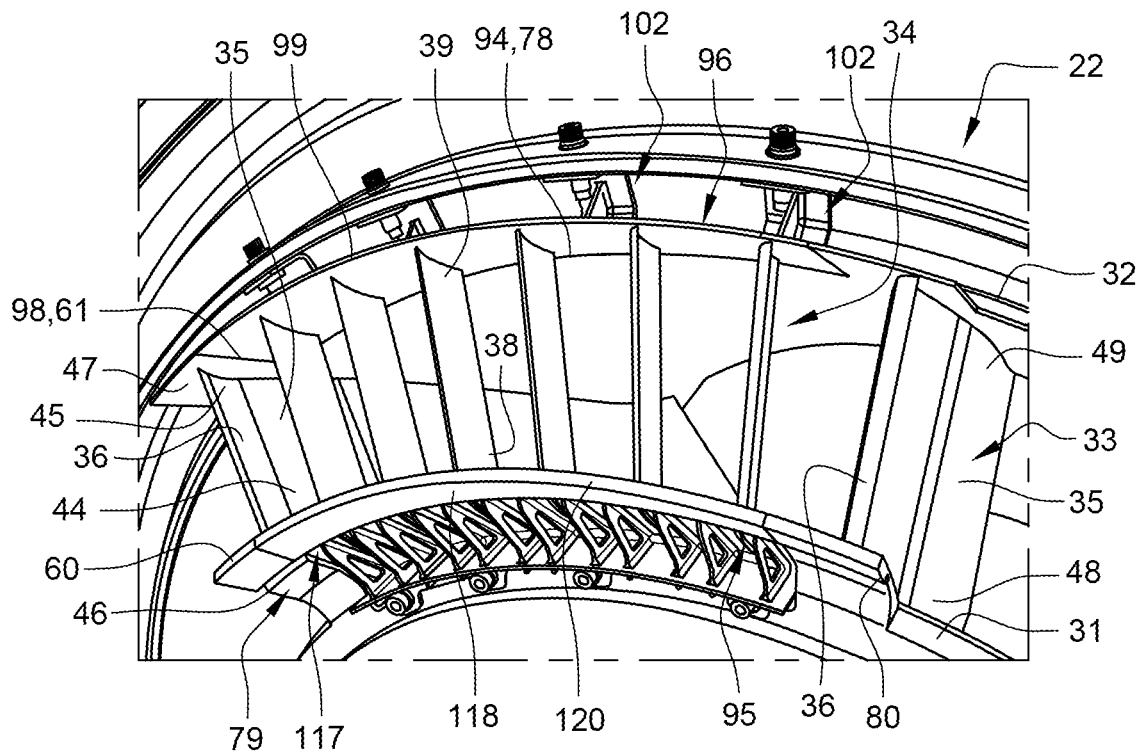
FIG. 3 is a perspective and substantially front view of a turbomachine straightening intermediate casing according to the invention.
Figure 4:
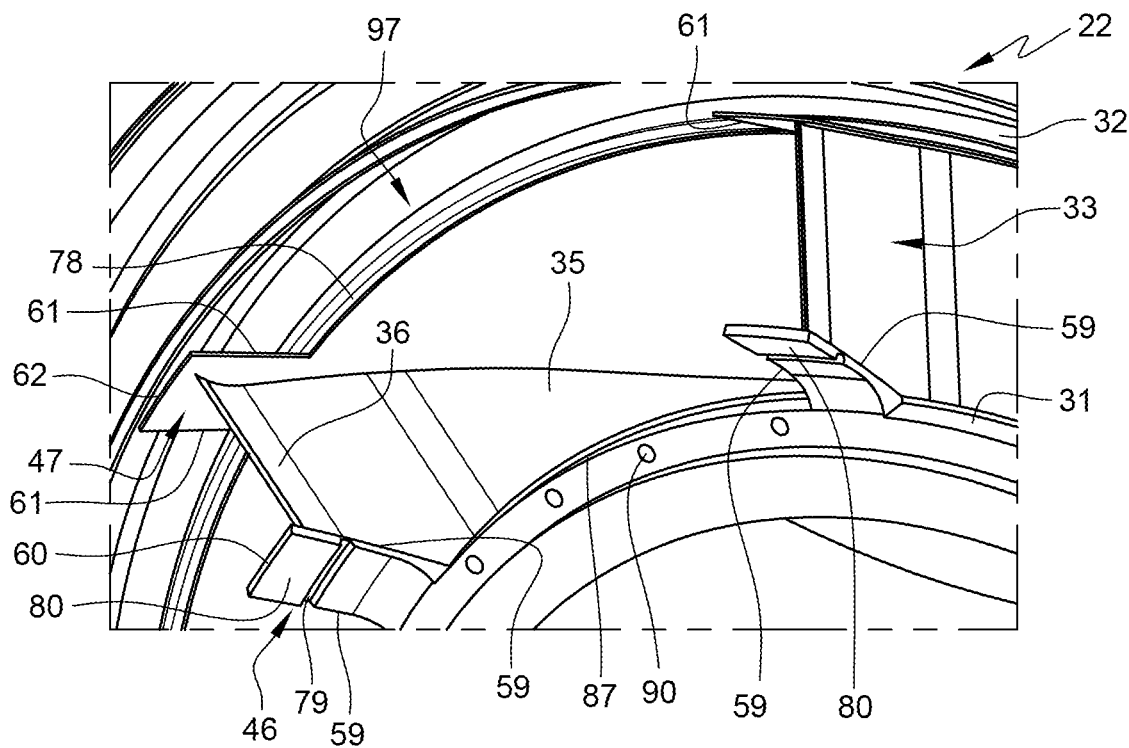
FIG. 4 is a perspective and substantially front view of an example of a straightening intermediate casing with aerodynamic members and which is intended to receive a stator vanes assembly added on according to the invention.

With reference to FIGS. 3 and 4, the straightening intermediate casing 22 is annular and centred on the longitudinal axis X. The intermediate casing 22 is located at the "gooseneck" of the hub 30 (shown in FIG. 1) of the turbomachine. The intermediate casing 22 comprises an annular radially inner shroud 31 and an annular radially outer shroud 32 which are centred on the longitudinal axis. The radially inner and outer shrouds are concentric. In the present example, the intermediate casing 22 is monobloc with the radially inner and radially outer shrouds 31, 32 (i.e., the shrouds 31, 32 are integrally formed with). In this case and advantageously, the intermediate casing 22 is produced by additive manufacturing.

In another embodiment not shown, the intermediate casing 22 is formed from a plurality of angular monobloc casing sectors which are arranged adjacently in a circumferential direction about the longitudinal axis X and which are fixed together to form a ring.

The intermediate casing 22 also comprises at least one aerodynamic member 33 which extends radially between the radially inner 31 and outer 32 shrouds. At least one stator vane 34 is arranged adjacent to the aerodynamic member 33 in the circumferential direction around the longitudinal axis X. In particular, a plurality of stator vanes 34 are arranged regularly around the longitudinal axis X and between two aerodynamic members 33.

The stator vanes 34 are also guide vanes. In the following, the term "stator vane" is used for the intermediate casing 22 and the term "guide vane" is used for the compressor. Here, the last row of guide vanes of the compressor is integrated into the intermediate casing 22 so as to perform a straightening function at said intermediate casing and to achieve axial gain. In other words, all stator vanes are integrated in an inter-arm space along the circumferential direction. The last annular row of guide vanes of the compressor belongs to the intermediate casing 22 which is fixed. And this intermediate casing as configured allows the air flow to be rectified at the outlet of the last row of movable vanes 4a of the low pressure compressor, here upstream.

Figure 5:
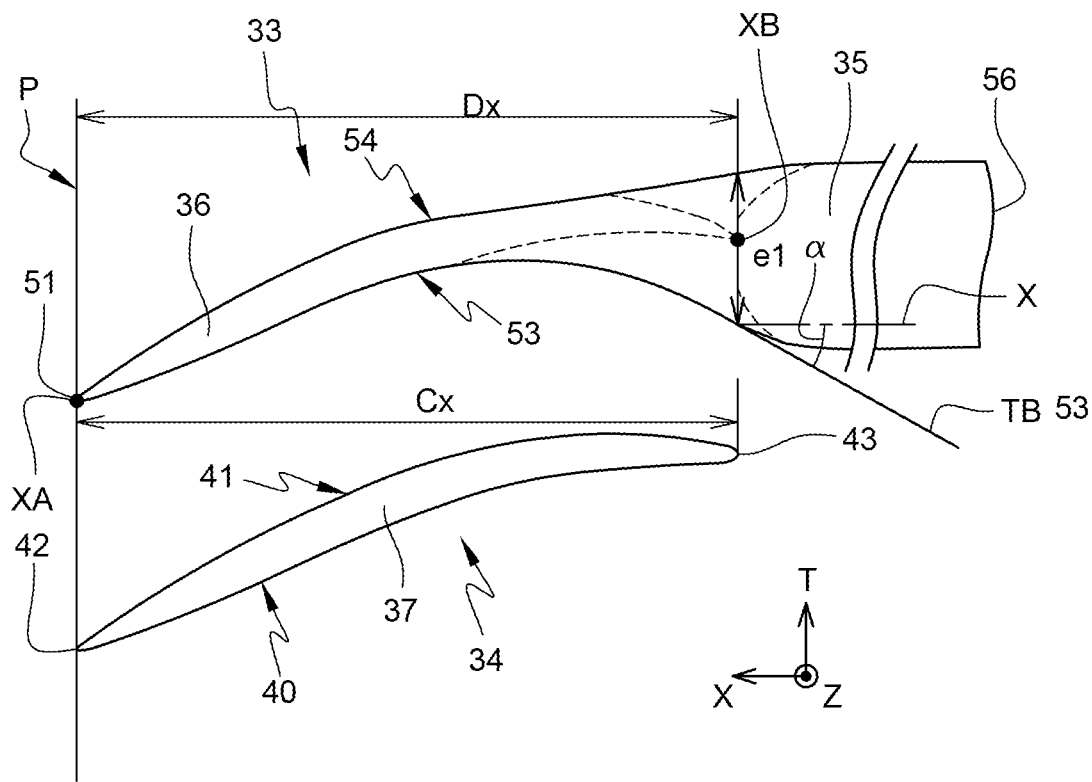
FIG. 5 illustrates schematically and in cross-section an aerodynamic member formed by a profiled portion and a structural arm downstream of the profiled portion and an adjacent stator vane along a circumferential direction, the aerodynamic member and the stator vane extending transversely in a primary vein of the turbomachine according to the invention.

In particular, in FIG. 5, the aerodynamic member 33 is formed by a structural arm 35 and a profiled portion 36 arranged upstream of the structural arm 35. The profiled portion 36 has the profile of a stator vane (or guide vane) which is essentially integrated into the structural arm. The profiled portion 36 allows the aerodynamic airstream at the outlet of the low-pressure compressor 4 to be straightened, while the structural arm 35 allows the radially inner shroud 31 and the outer shroud 32 to be connected structurally. The structural arm even supports the hub 30 and the inter-vein casing 16 of the turbomachine and transmits the forces of the turbomachine.

Each stator vane 34 comprises a blade 37 which extends substantially radially between a radially inner end 38 and a radially outer end 39 (see FIG. 3). The stacking axis of the stator vanes (between the radially inner and outer ends 38, 39) may be at an angle to the radial axis Z (the stacking axis is not fully parallel to the radial axis Z). The blade 37 comprises a pressure side 40 and a suction side 41 which are connected upstream by a leading edge 42 and downstream by a trailing edge 43. The pressure and suction sides 40, 41 are opposite each other along a transverse axis T (perpendicular to the longitudinal axis or along the circumferential direction). The cross-section of the vane has a curved profile. Each blade 37 of the stator vane 34 has an axial chord Cx which is measured between the leading edge 42 and the trailing edge 43 substantially along the longitudinal axis.

The profiled portion 36 and the structural arm 35 are advantageously monobloc so as to optimise the mass gain of the turbomachine and the mounting operations. For the same purpose, the aerodynamic member 33 is monobloc with the intermediate casing 22, i.e., with the radially inner and outer shrouds 31, 32. The primary flow circulates between the two shrouds 31, 32 and also between the aerodynamic members 33 (structural arms and profiled portion).

The aerodynamic member 33 extends substantially axially between a leading edge 51 and a distal edge 56. The leading edge 51 and the distal edge 56 are connected by a pressure side 53 and a suction side 54. There is surface continuity between the pressure sides of the profiled portion and the structural arm (which form the pressure side 53) and between the suction sides of the profiled portion and the structural arm (which form the suction side 54). The leading edge 51 of the aerodynamic member 33 is aligned with the leading edge 42 of the adjacent stator vanes 34 in a plane P perpendicular to the longitudinal axis X.

Also in FIG. 5, the profiled portion 36 comprises an upstream edge which is formed or carried by the leading edge of the aerodynamic member. The upstream edge of the profiled portion 36 is located at a predetermined axial distance Dx (delimited by a point XA) from a zone of intersection (delimited by a point XB) between the profiled portion and the structural arm. This axial distance Dx corresponds to the axial length of the profiled portion 36. The axial length is substantially equal to the axial chord length Cx of a stator vane 34. The zone of intersection has a thickness e1 in the circumferential direction substantially equal to three times the master torque of the profiled portion 36 (which also corresponds to the master torque of a stator vane 34). The thickness e1 is measured between the pressure side 53 and the suction side 54 of the aerodynamic member 33. The tangent TB passing through point XB at the pressure side of the structural arm has a predetermined angle α (alpha) with respect to the longitudinal axis X and is between 5° and 10°.

With reference to FIG. 3, the profiled portion 36 extends radially between a radially inner end 44 and a radially outer end 45. Similarly, the structural arm 35 extends radially between a radially inner end 48 and a radially outer end 49. The profiled portion 36 and the structural arm 35 are of course of the same radial height.

Advantageously, the stator vanes 34 and the aerodynamic members 33 are solid.

As can be seen in FIG. 4, a radially inner platform 46 extends axially from a circular radially inner edge 87 of the radially inner shroud 31. In particular, the platform 47 extends upstream from the radially inner edge as shown in FIG. 3. This radially inner platform 46 comprises two circumferential flanks 59 which are opposed in the circumferential direction and an upstream rim 60 which is axially offset from the radially inner edge 87. Advantageously, the upstream rim 60 extends in a direction parallel to the radially inner edge 87. The radially inner platform 46 further comprises a radially inner surface 79 which carries a first layer 80 of abradable material. The abradable material is readily decomposable and friable upon contact with the rotor (the last row of movable vanes of the low-pressure compressor) while providing a seal therewith. The abradable material comprises a metallic or non-metallic material. This first layer 80 extends in the circumferential direction and across the entire transverse width of the radially inner platform.

A radially outer platform 47 also extends axially from a radially outer edge 78 of the radially outer shroud 32. Similarly, the platform 47 extends upstream from the radially outer edge as shown in FIG. 3. The radially outer platform 47 comprises two opposing circumferential flanks 61 which are joined by an upstream rim 62. This is parallel to the radially outer edge 78.

The radially inner and outer platforms 46, 47 are monobloc with the radially inner and outer shrouds 31, 32. The radially inner end 44 of the profiled portion 36 is secured to the radially inner platform 46 and the radially outer end 45 of the profiled portion 36 is secured to with the radially outer platform 47. In other words, the profiled portion 36 extends radially between the radially inner platform and the radially outer platform. A part of the radially inner and outer ends of the structural arm 35 are respectively secured to the radially inner and outer platforms as illustrated in FIG. 4.

In particular and with reference to FIG. 3, the radially inner end 44 is secured to the radially inner shroud 31 and the radially outer end 45 is secured to with the radially outer shroud 32. The structural arm 35 also comprises a radially inner end 48 which is secured to the radially inner platform 46 and a radially outer end 49 which is secured to the radially outer platform 47.

Figure 10:
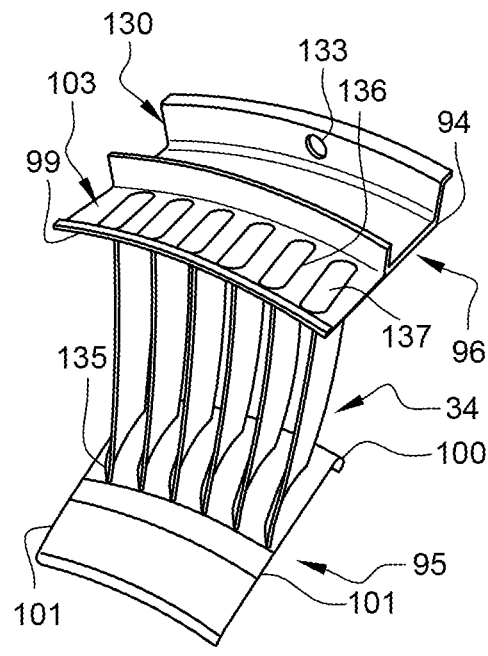
FIG. 10 represents another embodiment of a straightening assembly intended to be added on a turbomachine intermediate casing and which comprises stator vanes also added on according to the invention.

The stator vanes 34 between the aerodynamic members 33 are added on the intermediate casing 22. The term "added on" is used in this description to mean a separate part (in this case the stator vanes) from the intermediate casing and which is not produced in the same way as the intermediate casing. In this case, the stator vanes are made separately from the rest of the components of the intermediate casing. These are then added on the intermediate casing and fixed. For this purpose, the radially inner end 38 of each stator vane 34 is secured to a first platform 95, which extends over an angular portion in a circumferential direction (see FIGS. 3, 11). Similarly, the radially outer end 39 of each stator vane is secured to a second platform 96, which extends over an angular portion along the circumferential direction (as illustrated in FIGS. 3, 10). The first and second platforms are added on and fixed equally and respectively to the intermediate casing 22 (in particular the shrouds). The stator vanes 34 and the first and second platforms 95, 96 are monobloc so as to form at least one straightening assembly added on between two aerodynamic members 33 (circumferentially). Six stator vanes 34 each extend radially between the first and second platforms 95, 96. These stator vanes 34 advantageously have an identical axial chord.

Generally speaking, the intermediate casing 22 comprises about six aerodynamic members 33 distributed regularly around the longitudinal axis and at least about forty stator vanes 34 installed around the longitudinal axis as well (and between the aerodynamic members 33 circumferentially).

As can be seen in FIG. 4, the radially inner and outer platforms 46, 47 form a notch 97 which are intended to receive the first platform 95 and the second platform 96 respectively. The notches 97 are delimited respectively by the (radially inner or outer) edge 78, 87 of a shroud 31, 32 and two flanks 61, 59 of the adjacent radially inner and outer platforms 46, 47 which are spaced apart and which face each other in the circumferential direction. The edge 78, 87 and both flanks 61, 59 are U-shaped.

The second platform 96 comprises a downstream edge 94 which is in abutment against the radially outer edge 78 of the radially outer shroud 32. Each circumferential end 98 of a second platform abuts a flank 61 of a circumferentially adjacent a radially outer platform 47. The second platform 96 also comprises an upstream edge 99 (axially opposite the downstream edge 94) which has surface continuity with the upstream rim 62 of the radially outer platform 47. In other words, the length of the second platform 96 along the longitudinal axis is substantially equal to the length of the radially outer platform 47.

The first platform 95 comprises a downstream edge 100 (see FIG. 10) which is in abutment against the edge 87 of the radially inner shroud. Each circumferential end 101 of a first platform 95 is in abutment against a flank 59 of a circumferentially adjacent radially inner platform 46. The first platform 95 also has a radially inner surface 117 which also comprises a second layer 118 of abradable material comprising for example a metallic or non-metallic material. The second layer 118 of abradable material is aligned along the circumferential direction with the first layer 80 of abradable material of the radially inner adjacent platforms. The first rim 60 of the first layer of material 80 has surface continuity with the second rim 120 of the adjacent second layer 118 of material. The first and second layers 80, 118 of material have the same thickness along the radial axis as well as the same length along the longitudinal axis and the same width transversely.

Figure 6:
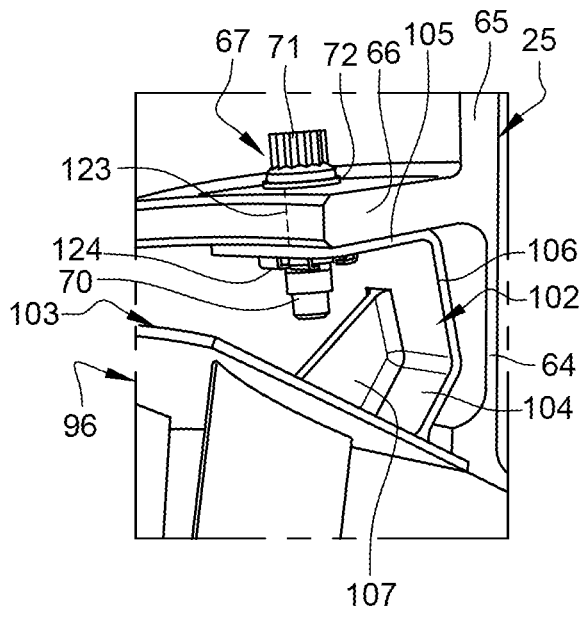
FIG. 6 is a perspective and detail view of an example of the upper fixation of a stator vane assembly to the intermediate casing according to the invention.

In FIG. 6, the second platform 96 is attached to the radially outer shroud via fixing members 67. The radially outer shroud 32 comprises an annular radial wall 25 (see FIGS. 2, 8, 9) which extends radially towards the outside from an upper surface 63 (see FIG. 2) of the radially outer shroud 32. The radial wall 25 is generally T-shaped in axial cross-section with two opposed radially extending legs (referred to as the lower branch 64 and the upper branch 65) and an axial leg 66. The lower branch 64 is connected to the radially outer shroud and the upper branch 65, extending radially towards the outside, is intended to be connected to a fixed structure of the turbomachine.

In the example embodiment, the second platform 96 comprises tabs 102 (four tabs as shown in FIG. 3) which extend radially towards the outside from a radially outer surface 103 of the second platform 96. Each tab 102 has a generally U-shaped axial cross-section with two branches (hereinafter referred to as first branch 104 and second branche 105) and a bottom 106. A rib 107 connects the bottom of each tab and the second platform 96. The rib 107 is also connected to the first branch 104. The rib 107 is located in a median area of the tab along the circumferential direction in the installation situation. The first branch 104 is defined in a plane which has an open angle of approximately 75° with the plane in which the bottom is defined. In contrast, the plane of the bottom 106 forms an angle of approximately 90° (right) with the second leg 105. The first leg 104 rises from the radially outer surface 103. The bottom 106 is in contact with the lower branch 64 of radial wall of the radially outer shroud. The second leg 105 abuts and is secured with fixing members 67 to the axial leg 66 of the radial wall. In the installation situation, the plane of the second branch 105 is parallel to that in which the axial leg 66 is defined. Similarly, the plane of the bottom 106 of the tab is also parallel to the plane of the lower branch 64.

The second branch 105 comprises an opening (not shown) passing through it on either side along an axis parallel to the radial axis. This opening is intended to face a through orifice 123 (one of which is shown in dotted line in FIG. 6) which the axial leg 66 comprises. The axial leg 66 comprises a plurality of through orifices 123 whose axes are substantially parallel to the radial axis. Each opening and corresponding through orifice 123 is intended to cooperate with the fixing members and is distributed regularly along the circumferential direction. The fixing members 67 can make a threaded connection and can be of the type screw, stud, nut or bolt. We see a screw 70 passing through each through orifice 123 and opening, and a nut 124 which clamps the second branch 105 on the axial leg 66. The nut 124 is advantageously, but not limited to, a riveted nut. A washer 72 is arranged between the head 71 of the screw 70 and the axial leg 66 of the radial wall of radially outer shroud. The fixing here is said to be radial.

Figure 7:
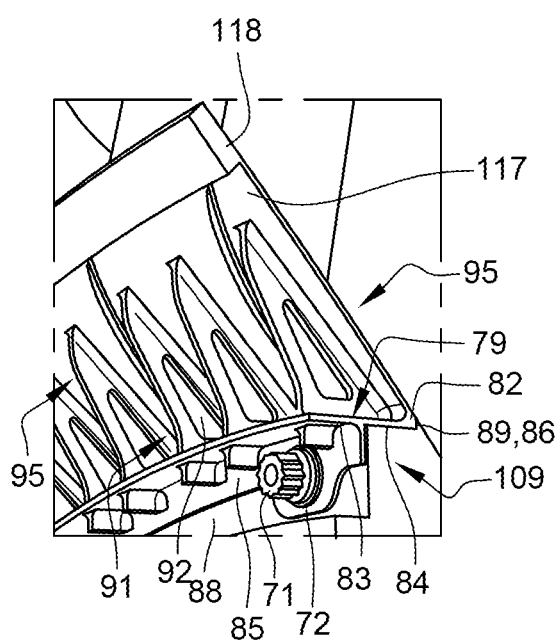
FIG. 7 is a perspective and detail view of an example of the lower fixation of a stator vane assembly to the intermediate casing according to the invention.

With reference to FIG. 7, the first platform 95 is also attached to the intermediate casing via fixing members 67 substantially similar to those described above (screw, bolt, nut, stud, bolt, or any element allowing easy mounting and/or dismounting). The first platform comprises a base 109 extending from its downstream end 82. The first platform and the base here have a substantially V-shaped axial cross-section. The base 109 here has an axial cross-section with a general T-shape with an upstream branch 83, a downstream branch 84 and a radial leg 85. The downstream branch 84 extends along the longitudinal axis and includes a downstream end 86 intended to engage an annular collar 89 defined in a radial plane of the radially inner shroud 31. The downstream branch 84 is intended to be arranged radially towards the outside of a circumferential face of an annular range 88 of the radially inner shroud 31. The upstream branch 83 also extends axially. As for the radial leg 85, the latter is intended to bear against the annular range 88 which is defined in a plane perpendicular to the longitudinal axis. The annular range comprises several bores 90 (see FIG. 4) which are arranged regularly around the longitudinal axis. Each bore 90 has an axis substantially parallel to the longitudinal axis. In this embodiment (shown in FIG. 4) there are four bores.

The radial leg 85 comprises a hole 93 (see FIG. 8) passing through it on either side along the longitudinal axis X. Each hole is intended to cooperate with a bore 90 in the annular range 88 and to receive a screw cooperating with an insert. A washer 72 is provided between the screw head 71 and the radial leg 85. At least one reinforcement 91 also extends between the radially inner surface 79 of the base and the radially inner surface 117 of the first platform 95 so as to provide rigidity to the latter. Several reinforcements (twelve in FIG. 3) are distributed regularly around the longitudinal axis. Each reinforcement has a generally triangular axial section with an opening 92 which passes through it on either side in the circumferential direction (in the installation situation) so as not to impact the mass of the turbomachine.

Figure 8:
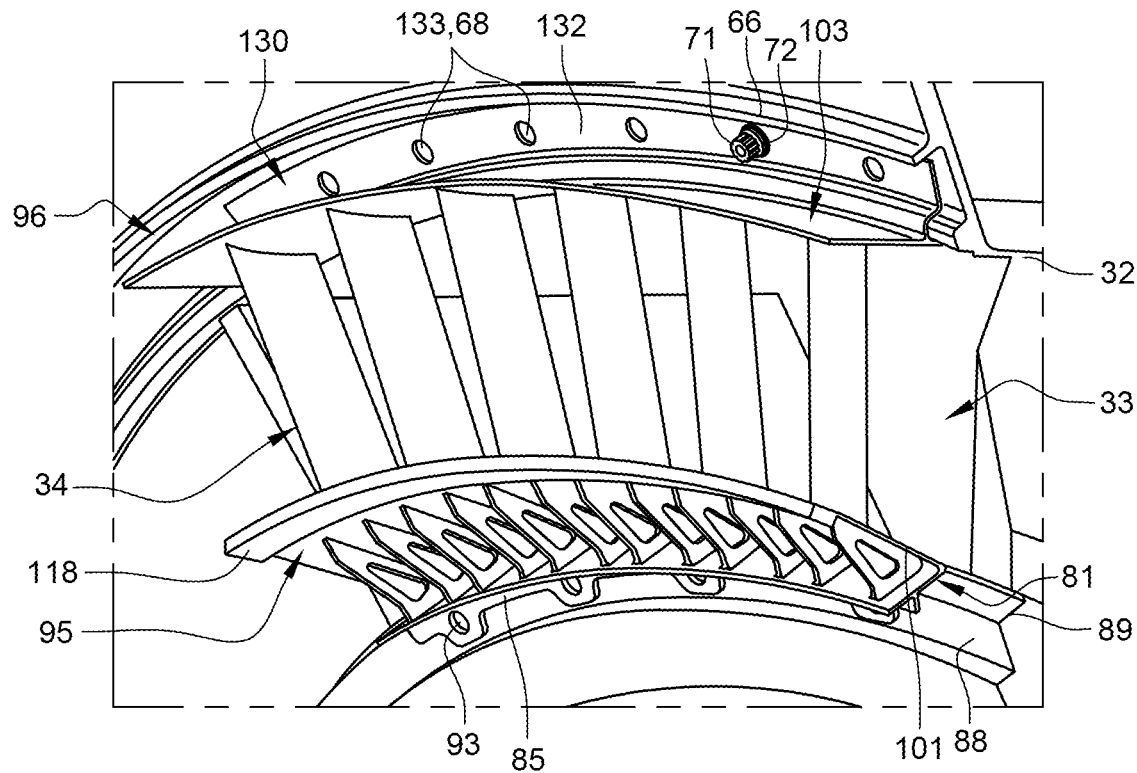
FIG. 8 shows a perspective and front view of another embodiment of a straightening intermediate casing receiving a straightening assembly added on between two aerodynamic members according to the invention.
Figure 9:
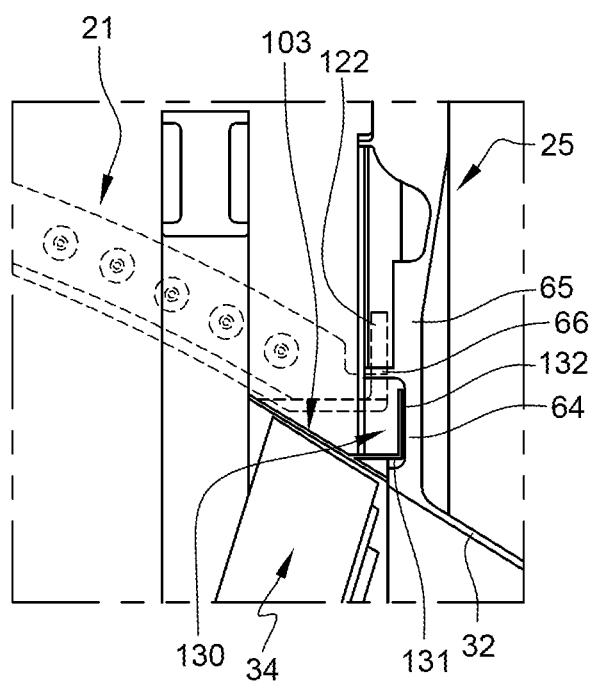
FIG. 9 is an axial sectional view of the intermediate casing of FIG. 8 according to the invention.

A further embodiment of a straightening assembly is illustrated in FIGS. 8 and 9. In particular, the second platform 96 is added on and fixed to the intermediate casing 22 by means of a radial attachment flange 130. The latter extends, on the one hand, radially from the radially outer surface 103 of the second platform 96, and on the other hand, along the circumferential direction over the entire periphery of the second platform 96. The radial attachment flange 130 has a generally L-shaped axial cross-section with a first axial wall 131 and a second radial wall 132. The first axial wall 131 extends from the radially outer surface 103 of the second platform 96. The second radial wall 132 extends along the radial axis from one end of the first axial wall 131. The second radial wall 132 has a bearing surface (perpendicular to the longitudinal axis) which is intended to bear (plane on plane) against the lower branch 64 of the radial wall 25 of the radially outer shroud 32 as shown in FIG. 9. This allows better positioning of the straightening assembly on the intermediate casing 22. The second radial wall has a lower height than the lower branch 64. The latter therefore stops just below the axial leg 66 of the radial wall 25. The orifices 68 pass through the radial wall 25 on both sides and are arranged regularly around the longitudinal axis. These orifices 68 each have an axis substantially parallel to the longitudinal axis. The radial attachment flange 130 comprises axial bores 133 which pass through it on both sides. The orifices 68 and the axial bores 133 are respectively opposite each other in FIG. 8. These are intended to cooperate with fixing members 67 which provide an axial fixation. In the example shown, a screw cooperating with an insert is inserted into an axial bore 133 and a corresponding orifice. A washer 72 is fitted between the screw head 71 and the second radial wall 132.

The first platform 95 is fixed to the radially inner shroud 31 in a similar manner to that shown in FIG. 7. The fixation here is axial and locks the first platform axially to the intermediate casing 22.

Figure 11:
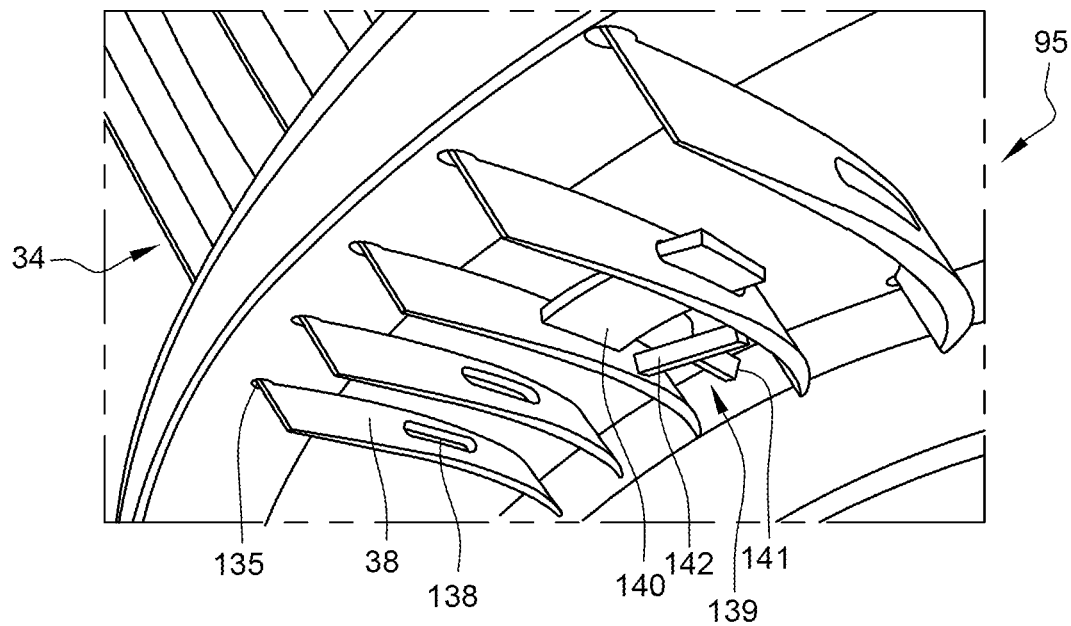
FIG. 11 is a bottom view of an embodiment of locking the radially inner ends of the stator vanes to a turbomachine intermediate casing platform according to the invention.

In yet another embodiment illustrated in FIGS. 10 and 11, the straightening assembly is added on and fixed to the radially inner and outer shrouds 31, 32. The radial attachment flange 130 comprises axial bores 133 which pass through it on both sides and which cooperate with the orifices 68 in the radial wall 25. Fixing members 67 (screw, insert, washer) allow the attachment flange 130 and the radial wall 25 to be secured. This embodiment differs from the previous embodiment in that the first and second platforms comprise first and second slots 135, 136 which are intended to receive respectively the radially inner and outer ends 38, 39 of the stator vanes 34 which are added on them. In particular, each first slot 135 and second slot 136 respectively pass through the platforms 95, 96 on either side along the radial axis. These first and second slots 135, 136 are also distributed regularly around the longitudinal axis. The radially outer end 38 of each stator vane 34 is secured with a head platform (or abutment platform) 137 which has a larger dimension than the slots. The latter have a complementary shape to the blades. More specifically, the dimensions are equal to or slightly larger (of the order of +0.2 mm) than those of the blade 37 of the stator vane 34 so as to allow the passage of a blade. The head platform 137 rests on the radially outer surface 103 of the second platform 96. Advantageously, but without limitation, the head platforms 137 are welded to the second platform 96.

With respect to the radially inner end 38 of the blades 37, these cooperate with at least one locking device 139 to hold them to the first platform 95. To this end, each radially inner end 38 comprises an opening 138 which passes through the blade on both sides transversely. Each opening 138 has an oblong or elongated shape in a direction substantially parallel to the longitudinal axis. As can be seen in more detail in FIG. 11, a locking device 139 comprises a fastener 140 which is inserted into at least one opening 138 so as to allow radial locking of the radially inner end to the first platform 95. Each fastener 140 has a cross-section substantially complementary to the axial cross-section of the opening. In FIG. 11, a fastener 140 is slid into two adjacent stator vane openings 138. The locking device 139 also comprises a rod 141 and an abutment 142, the rod 141 being free at one end and connected at the other end to the abutment 142. The abutment 142 also extends transversely between two radially inner ends of the vanes so as to hold them in position relative to each other.

Figure 12:
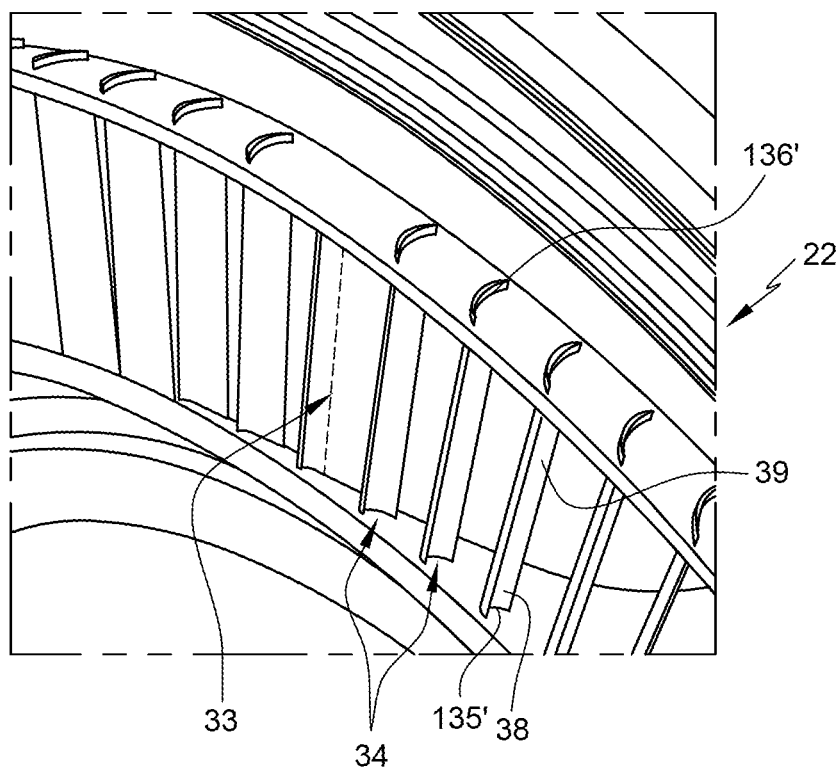
FIG. 12 illustrates an embodiment of mounting stator vanes on platforms of a turbomachine straightening intermediate casing according to the invention.
Figure 13:
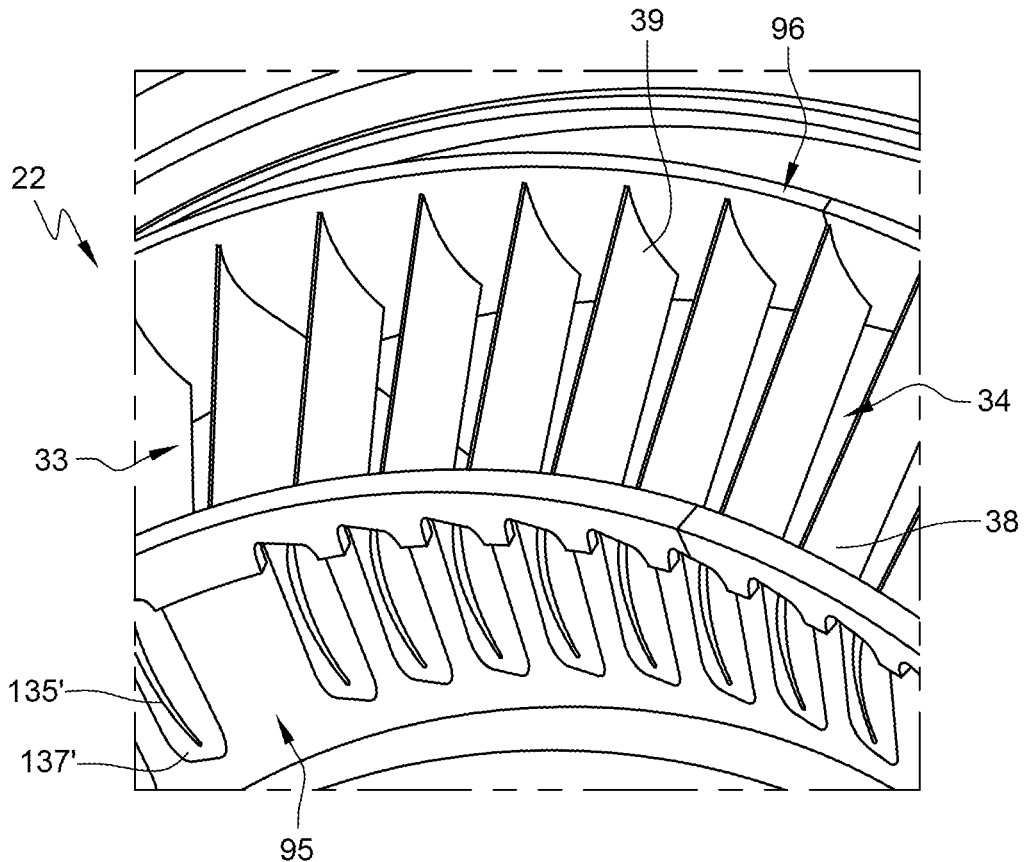
FIG. 13 shows a further embodiment of the arrangement of stator vanes on a turbomachine straightening intermediate casing according to the invention.
Figure 14:
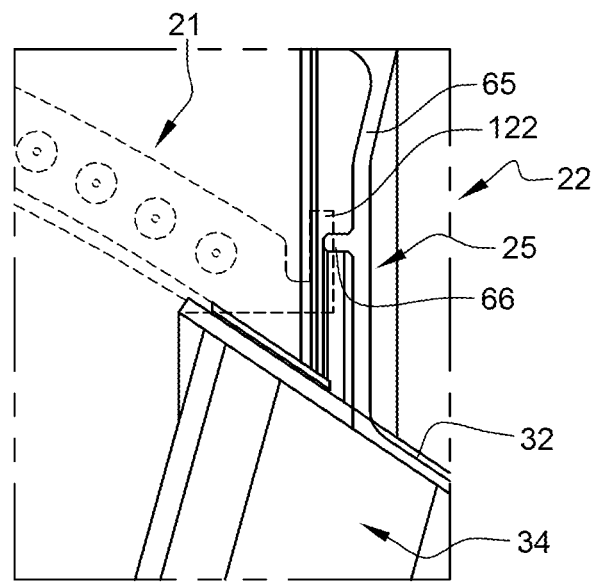
FIG. 14 is an axial cross-sectional view of the intermediate casing according to FIG. 13.

A further embodiment of the intermediate casing is illustrated in FIGS. 12 to 14. We see that the aerodynamic members 33 are monobloc (made in one piece) with the radially inner and radially outer shrouds. The first platform 95 and the second platform 96 are also monobloc with radially inner and radially outer shrouds. Advantageously, the intermediate casing (with the monobloc shrouds and aerodynamic members) is made by casting. The first platform 95 and the second platform 96 are continuous between two aerodynamic members 33. The first and second platforms comprise first and second slots 135', 136' respectively, which are intended to receive the radially inner and outer ends of the stator vanes 34. The slots 135', 136' extend radially through the walls of the first and second platforms 95, 96 on either side. The stator vanes 34 are added on thereto. The stator vanes 34 are made separately from the first and second platforms 95, 96 and from the rest of the intermediate casing members. In particular, each stator vane 34 is slid into a first slot 135' of the first platform 95 radially and towards the corresponding second slot 136'. The radially inner end 38 of each stator vane is equipped in this case with an abutment platform (or root platform) 137' (shown precisely in FIG. 13) which comes against the radially inner surface of the first platform 95. The radially outer ends are each attached to the second platform 96. Advantageously, but not limited to, the attachment of the radially inner ends is achieved by welding. Each abutment platform 137' is also welded to the first platform 95. Here, the intermediate casing is formed of a plurality of monobloc angular sectors. Alternatively, the intermediate casing may be formed as a single wheel comprising the radially inner shroud 31 (with the first platform 95 made of material) and the radially outer shroud 32 (with the second platform 96 made of material). Such a configuration facilitates the maintenance of the casing by intervening only on the damaged stator vane(s) and thus reduces the costs due to maintenance and manufacturing of parts.

With reference to FIGS. 9 and 14, the compressor casing 21 is fixed to the intermediate casing 22 at the radial wall 25. The compressor casing 21 comprises a bottom wall 122 which is defined in a plane containing the radial axis. This bottom wall 122 is intended to be fixed to the radial wall 25 and in particular to the upper branch 65. The axial leg 66 allows the compressor casing to be centred on the radial wall 25 of the intermediate casing 22. The bottom wall 122 extends radially above the axial leg 66. The bottom wall comprises orifices for the passage of fixing members on the axial leg 66.

The invention claimed is:

1. An annular intermediate casing for a turbomachine of longitudinal axis X, through which an aerodynamic air flow is intended to circulate at least in part, the intermediate casing comprising:
   an annular radially inner shroud,
   an annular radially outer shroud,
   a stator vane extending substantially along a radial axis Z, the stator vane comprising a blade with a leading edge and a trailing edge, and
   an aerodynamic member which is formed of a structural arm extending radially at least in part between the radially inner shroud and the radially outer shroud,
   wherein the stator vane extends between a first platform and a second platform and the aerodynamic member comprises a leading edge which is aligned with the leading edge of the stator vane in a plane perpendicular to the longitudinal axis X, the leading edge of the aerodynamic member being borne by a profiled portion positioned upstream of the structural arm in the direction of circulation of the aerodynamic air flow, the profiled portion and the structural arm being monobloc, wherein the aerodynamic member comprises a distal edge which is located downstream the trailing edge of the stator vane, and wherein the aerodynamic member is monobloc with the radially inner shroud and the radially outer shroud, wherein the intermediate casing comprising said aerodynamic member and at least a second aerodynamic member, said aerodynamic member and said at least second aerodynamic member are spaced along the circumferential direction about the longitudinal axis X, wherein the intermediate casing comprising a straightening assembly which is added on and disposed between said aerodynamic member and said at least second aerodynamic member, the straightening assembly comprising the first platform, the second platform and a plurality of said stator vane being distributed regularly along the circumferential direction, each leading edge of the plurality of stator vanes is aligned with the leading edge of the aerodynamic member in the plane perpendicular to the longitudinal axis X.

2. The intermediate casing according to claim 1, wherein the profiled portion extends radially between a radially inner platform and a radially outer platform, the radially inner and radially outer platforms being respectively monobloc with the radially inner shroud and the radially outer shroud, and in that the radially inner platform has a radially inner surface bearing a first layer of abradable material.

3. The intermediate casing according to claim 2, wherein the first platform and the second platform are each added on and attached to the radially inner shroud and the radially outer shroud respectively, the first platform having a radially inner surface bearing a second layer of abradable material, the second layer of abradable material being aligned along the circumferential direction with the first layer of abradable material.

4. The intermediate casing according to claim 1, wherein the first platform comprises a base which is attached to an annular bearing portion of the radially inner shroud with at least one fixing member providing an axial fixation.

5. The intermediate casing according to claim 1, wherein the second platform is fixed to a radial wall of the radially outer shroud which extends radially towards the outside from a radially outer surface and via at least one fixing member.

6. The intermediate casing according to claim 5, wherein the second platform has tabs, each tab extending from its radially outer surface, each tab being fixed to an axial leg of the radial wall with the fixing members providing a radial fixation.

7. The intermediate casing according to claim 6, wherein the second platform comprises a radial attachment flange extending radially towards the outside from its radially outer surface and along the circumferential direction on its entire periphery, the radial attachment flange being fixed to a lower branch of the radial wall that extends along the radial axis and with the fixing members providing an axial fixation.

8. The intermediate casing according to claim 1, wherein the straightening assembly is monobloc.

9. The intermediate casing according to claim 1, wherein the leading edge of the aerodynamic member is located at an axial distance from a zone of intersection between the profiled portion and the structural arm, and in that the zone of intersection has a thickness along the circumferential direction substantially equal to three times a master torque of the profiled portion.

10. The intermediate casing according to claim 1, wherein the stator vane has an axial chord measured between its leading edge and its trailing edge and in that the profiled portion has an axial length measured between the leading edge of the aerodynamic member and a zone of intersection substantially equal to the axial chord.

11. The intermediate casing according to claim 1, wherein the intermediate casing is made by casting or additive manufacturing.

12. An annular intermediate casing for a turbomachine with a longitudinal axis X, through which an aerodynamic air flow is intended to circulate at least in part, the intermediate casing comprising:
an annular radially inner shroud,
an annular radially outer shroud,
a stator vane extending substantially along a radial axis Z, the stator vane comprising a blade with a leading edge and a trailing edge, and
an aerodynamic member which is formed of a structural arm extending radially at least in part between the radially inner shroud and the radially outer shroud,
wherein the stator vane extends between a first platform and a second platform and the aerodynamic member comprises a leading edge which is aligned with the leading edge of the stator vane in a plane perpendicular to the longitudinal axis X, the leading edge of the aerodynamic member being borne by a profiled portion arranged upstream of the structural arm along the direction of circulation of the aerodynamic air flow, and
wherein the profiled portion and the structural arm being monobloc, and in that the aerodynamic member is monobloc with the radially inner shroud and the radially outer shroud and in that the first platform is monobloc with the radially inner shroud and the second platform is monobloc with the radially outer shroud, the first and second platforms each comprising respectively a plurality of slots of complementary shape with a blade of the stator vane, and a plurality of stator vanes distributed regularly about the longitudinal axis X, each of said plurality of stator vanes comprising a radially inner end which is received in a corresponding first slot of the first platform and a radially outer end which is received in a corresponding second slot of the second platform.

13. The intermediate casing according to claim 12, wherein each of the radially outer or inner ends is secured to an abutment platform lying radially towards the outside of a first or second platform and the other of each of the radially inner or outer ends radially opposite is locked or fixed to the first or second platform.

14. The intermediate casing according to claim 13, wherein the locking or fixing is achieved by a locking device or a weld.

15. A dual flow turbomachine with a longitudinal axis X, comprising:
at least one fan generating an air flow and comprising at least one annular row of fan blades carried by a hub of longitudinal axis X,
a splitter nose, downstream of the at least one annular row of fan blades separating the air flow into a primary flow circulating in an annular primary vein and a secondary flow circulating in an annular secondary vein,
at least one compressor arranged downstream of an inlet to the primary vein formed of an annular edge of the splitter nose and comprising annular rows of movable vanes and stator vanes, and
at least one turbomachine intermediate casing according to claim 1, the intermediate casing comprising the plurality of stator vanes distributed around the longitudinal axis X so as to straighten the air flow leaving a last row of movable vanes of the at least one compressor.

16. A dual flow turbomachine with a longitudinal axis X, comprising:
- at least one fan generating an air flow and comprising at least one annular row of fan blades carried by a hub of longitudinal axis X,
- a splitter nose, downstream of the at least one annular row of fan blades separating the air flow into a primary flow circulating in an annular primary vein and a secondary flow circulating in an annular secondary vein,
- at least one compressor arranged downstream of an inlet to the primary vein formed of an annular edge of the splitter nose and comprising annular rows of movable vanes and the plurality of stator vanes, and
- at least one turbomachine intermediate casing according to claim 12, the intermediate casing comprising the plurality of stator vanes distributed around the longitudinal axis X so as to straighten the air flow leaving a last row of movable vanes of the at least one compressor.

\* \* \* \* \*